United States Patent [19]

Clausen et al.

[11] Patent Number: 4,936,652
[45] Date of Patent: Jun. 26, 1990

[54] REAR PROJECTION SCREEN

[75] Inventors: Johannes Clausen, Charlottenlund; Erik Clausen, Gentofte, both of Denmark

[73] Assignee: Dai Nippon Printing Co., Ltd., Tokyo, Japan

[21] Appl. No.: 320,437

[22] Filed: Mar. 8, 1989

[30] Foreign Application Priority Data

Sep. 28, 1988 [DK] Denmark ................ 5414/88

[51] Int. Cl.⁵ .............................. G03B 21/60
[52] U.S. Cl. .................................. 350/128
[58] Field of Search ..................... 350/127, 128

[56] References Cited

U.S. PATENT DOCUMENTS

| | | | |
|---|---|---|---|
| 2,618,198 | 11/1952 | Luboshez | 350/128 |
| 2,738,706 | 3/1955 | Thompson, Jr. | 350/128 |
| 3,279,314 | 10/1965 | Miller | 350/128 |
| 4,469,402 | 9/1984 | Yata et al. | 350/128 |

FOREIGN PATENT DOCUMENTS

| | | |
|---|---|---|
| 180418 | 12/1954 | Austria . |
| 3149592 | 6/1983 | Fed. Rep. of Germany . |
| 165830 | 10/1982 | Japan . |
| 207235 | 12/1982 | Japan . |
| 114026 | 7/1983 | Japan . |

Primary Examiner—Richard A. Wintercorn
Attorney, Agent, or Firm—Larson and Taylor

[57] ABSTRACT

A transparent rear-light projection screen with V-shaped grooves is described, where the rear side of the screen, i.e. the side turned towards the projector is supplied with outwardly extending, elongate parallel lenses, the focal point of which is congruent with the front plane of the screen which is made up of outwardly extending elongate projections on whose tops the light can emit, and where—between the tops of the projections—there are grooves which are covered with material impenetrable to light, such as black color, for the purpose of increasing the contrast.

9 Claims, 7 Drawing Sheets

REAR PROJECTION SCREEN

The present invention covers a rear-projection screen, consisting of two screen elements, of which the rearmost element, closest to the projectors, serves the purpose of paralleling the light from the projectors, and the foremost element, which is the visually enhanced element, has at its reverse side, i.e. on the side facing the rearmost element, horizontal outwardly extending parallel elongated convex lenses, the focal length of which s equal to the thickness of the foremost element and which have on their front side, horizontal, outwardly extending, elongated projections from whose tops the light can emit and in which, between the tops of the projections there are grooves, which are covered with material impenetrable to light, e.g., black colour to increase the contrast.

BACKGROUND OF THE INVENTION

Rear-projection screens have to a great extent been used for video-projection devices, micro film readers, data equipment and flight simulators.

From the description of U.S. Pat. No. 3,279,314 and U.S. Pat. No. 2,738,706, rear light projection screens with lens tops are recognized by the front side, i.e. The side facing the observer. Common for both patents are that the individual lens tops on their inside are totalreflecting towards the parallel light of the projectors, ad the light—after total reflection—streams out of the lens tops. By observing a cross section through the lens tops it will be seen that the individual lenses form mutual V-shaped grooves. It is known from the above patents to fill these grooves with black colour or some other media containing light impenetrable material in order to increase the contrast.

The most essential difference from the above-mentioned patents and the present invention is that in the above-mentioned patents, the rear sides of the screen elements, i.e. those sides facing the projector are fully plane and thus do not contain any lens structure for deflecting the light. Another essential difference is that the above-mentioned U.S. Patents have cone-shaped lens tops, while the present invention has on the rear side of the foremost element horizontal outwardly extending, elongated convex lenses having its focal point congruent with the foremost elements front plane, where the light is emitted from the tops of the projections.

Further it is known from U.S. Pat. No. 2,618,198 to have a screen consisting of two screen elements where each screen element has groups of parallel cylindrical lenses facing the projectors, and further that each screen element's cylindrical lenses are placed at right angles to each other. The element, closest to the projectors, has on its rear side vertical outwardly extending, elongated convex lenses, and the focal point of which is congruent with the front plane of the screen foremost element. In order to obtain a good contrast effect, the screen front is applied with black covered strips as wide as possible. The space between the covered strips is for the purpose of emitting the light for the observer to see and which forms the picture concerned. The front side element is completely identical to the rear side element. However, the convex outwardly extending lenses are in a horizontal plane when the screen is applied in its user position.

Despite the fact that a so called Fresnel lens is applied in connection with the screen of the above-mentioned U.S. patent for paralleling of the light from the projector, this screen construction will only be applicable when "one" projector is used, in that the light beams from more than one projector will not all be parallel to one another and normal to the surface of the Fresnel lens, but will leave the Fresnel lens at an angle corresponding to the angle that the individual projectors' optical axes form mutually.

This again will have the consequence that light beams, which do not penetrate perpendicularly into the rear side of the picture forming foremost element, after deflection by the convex lenses on the reverse side of the foremost element will be displaced at an angle corresponding to the angle between the concerned projector's optical axis and the normal to the rear side of the foremost element and thus disappear in the black covered stripes.

The present invention further differs in that the surface for the emitting light does not comprise a lens structure.

It is a purpose of the present invention to prevent room light from penetrating into the screen and to reduce interial reflections in the screen's foremost element to increase the contrast.

It is known to produce a projected TV-picture by turning three projectors each of a separate color (red, green, blue) towards a transparent projection screen. The three projectors are usually positioned next to each other horizontally, and the forwarded, enlarged picture is turned towards the transparent screen. Because the three projectors are placed next to each other, their optical axes form angles with each other. Normally the optical axes form angles with each other from 7° to 12° depending on the size of the picture tube and the distance from picture tube to transmission screen.

Most designers of projection-TV place the green picture tube between the red and the blue so that the optical axis of the green picture is projected perpendicular to the transmitting screen. This has the effect that the optical axes of the blue and the red picture tube deviate e.g. by 9° in comparison with the optical axis of the green picture tube.

It is known to construct a TV-rear light projection screen as shown on FIG. 3, with the parallel convex lenses 18 and 19 vertically running, and where 15 indicates a Fresnel lens for paralleling the light, 16 indicates the picture forming screen with the lens 18, the focal point of which is at lens 19's surface and where, between the convex lenses 19 and 19a, there are placed projections 20 for applying the covered stripes to increase the contrast.

As lens 18 only serves the purpose of spreading the light horizontal, the screen of the well-known construction shown on FIGS. 3, 4, 5 and 6 is applied with powdered glass or $SiO_2$ for spreading the light in vertical direction.

These refractive particles are often evenly spread over the entire thickness of the screen element with the effect that not all rays will strike lens 19 at a well defined focal point, see FIG. 4, but will be deflected in undesired directions, and therefore, will have a bad effect on the picture quality. The light spreading particles are not marked on FIG. 3, 5 and 6, but are illustrated on FIG. 4 by the light beams 22, 23 and 25 winding through the screen, and further, the spreading of the light is illustrated by the vector crowd 24 and 24a. In addition it can be seen that the light beam 23, originating from the red or the blue light source is lost due to inner reflection, because the angle of incidence α is 7–10° from the optical axis of the green (center) light source.

FIGS. 5 and 6 show the path of rays penetrating into the screen and being thrown back to the observer. For clearness purposes, the Fresnel lens 26 in FIG. 5 has the concentric grooves towards the projectors. It can be seen that the light beam 27 is total totally reflected on the Fresnel lens 26's surface 26a. It is known among professionals to dull the front side 28, see FIG. 6. This dulling shall prevent inconvenient reflection from the surroundings. The irregular surface, spreading the light, will reduce the contrast considerably which is illustrated by the vector crowds 29a, 30 and 31a, 32. The explanation of this contrast reduction is that an irregular surface will always have an angle in relation to the screen surface, so that no matter where in the room the light beam comes from, it will penetrate the surface 28.

It is known among professionals that the picture forming ability of a rear light projection screen is reduced when it is used in a very illuminated room. It is further known that spreading of the light in the screen, of the light that is projected upon the screen, is spread outside the desired illuminated area, in that the light can move from the illuminated groove to the neighbouring grooves, see FIGS. 4, 5 and 6. The same applies to light falling into the screen from the front side of the screen of which some of the light is lost inside the screen, while some is spread to the neighbouring grooves or is reflected from the Fresnel lense as shown in FIGS. 5 and 6, and after that is reflected out to the observer.

Both situations have inconvenient effects on the picture formation, hereunder especially fading of the shades.

It is the purpose with the present invention to prevent the mentioned inner reflection and thereby increase the contrast.

According to the invention, this contrast improvement is obtained by providing the rear side of the foremost screen element with linear horizontally placed upright convex lenses, the purpose of which is to gather the arriving light beams and direct them towards the space of the horizontal forerunning cams on the front side, and on whose tops the light comes out and between which there are V-shaped grooves and whose sides are applied with a medium impenetrable to light.

The rear light projection screen, according to the present invention, is characteristic by being a transmitting lens screen without inner reflecting surfaces in the screen, and where each individual lens element on the picture forming or front side of the foremost screen element cannot reflect light to the neighbouring lens, because the individual picture forming lenses are separated by V-shaped grooves.

BRIEF DESCRIPTION OF THE DRAWINGS

The invention will now be explained in more detail with reference to the drawings, where

FIGS. 9 and 10 show drawings corresponding to FIG. 2 for illustration of different modified embodiments for the screen, according to the invention.

DETAILED DESCRIPTION OF THE PREFERRED EMBODIMENTS

Figure 1:
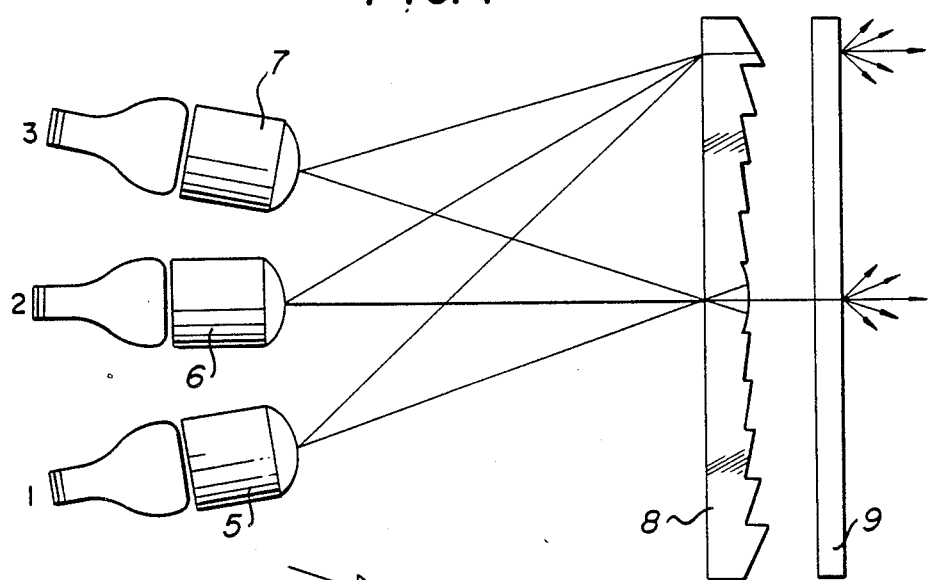
FIG. 1 shows a colour projection TV-system consisting of a two-piece projection screen to illustrate the application of projection screens of the type mentioned here.

FIG. 1 shows how the three projectors 1, 2 and 3 project TV-pictures towards the rear side of a projection screen, 8 and 9. Each projector emits green, red and blue light respectively. The three projectors are placed next to each other horizontally so that projector 2, which most often is the green projector, has its optical axis perpendicular to the screen 8–9.

The optical axes of the projectors 1 and 3, often form an angle of 6°–10° in comparison to projector 2.

By means of the three projectors 1, 2 and 3 as well as the lenses 5, 6, and 7 mounted in front, it is possible to form—proportional to the projectors—an enlarged picture on the screen 8–9.

Figure 2:
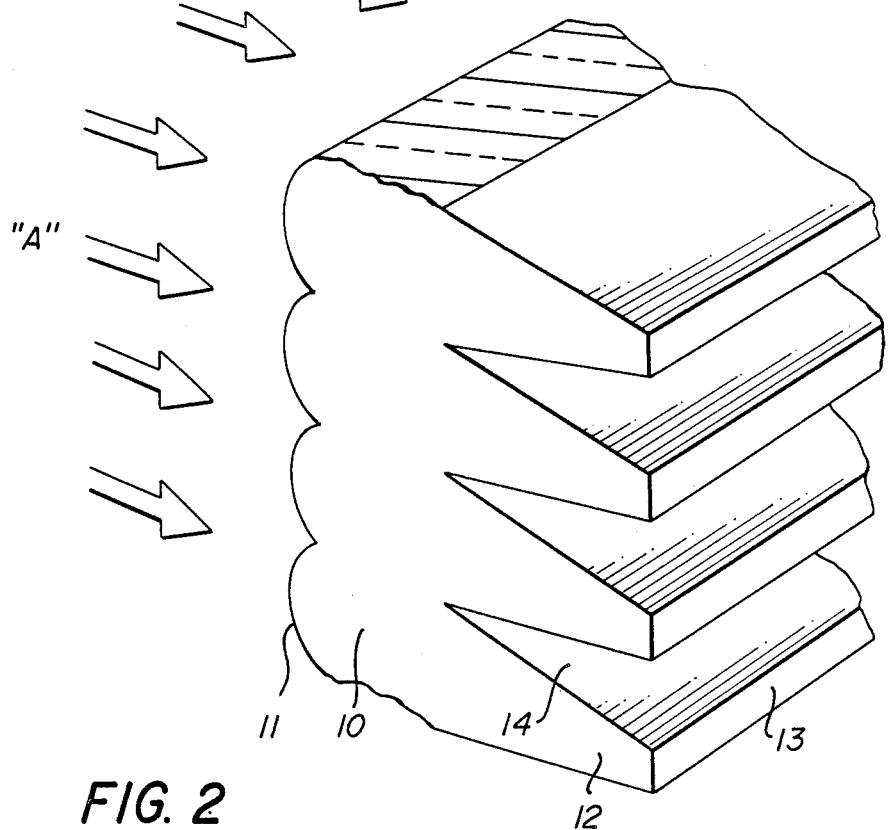
FIG. 2 shows a perspective cut of an embodiment for the screen, according to the invention.

FIG. 2 shows an embodiment in perspective for the screen, according to the invention, where 10 indicates the screen's basis material, e.g. acrylic. The rear side of the foremost screen element, i.e. The side turning towards the light source, is provided with outwardly extending parallel elongated convex lenses 11, the focal point of which is congruent with the screen's foremost element front plane, consisting of outwardly extending elongated projections 12, on whose tops 13 the light can emit and where, between the tops of the projections there are grooves 14, covered with material impenetrable to light, e.g., black colour, to increase the contrast. In FIG. 2 the light beams "A" are paralleled and strike the screen as normal to its surface. On the rear side, of the foremost screen element the screen is provided with outwardly extending lenses 11—parallel with the centre line connecting the projectors mutually, if 2 or 3 projectors are applied for the concerned projection set. For the rear light projection TV, the three projectors 1, 2 and 3 in FIG. 1 are normally placed with the centre line, connecting these horizontally. If turning the screen 10 in FIG. 2 90° so that the lenses 11 and the tops 13 of projections 12 form an angle of 90° compared to the centre line for the projectors, the light beams from projector 1 and 3 will be deflected so that they strike the V-shaped grooves inner sides and are adsorbed by the black colour. In placing the screen 10's lenses 11 and 13 parallel with the centre line connecting the projectors, light beams from projector 1 and 3 will also be transmitted through top 13 of projections 12, because these have no diffusion limitations at horizontal level. For diffusion of the light horizontally and vertically there are refractive particles at the tops 13 of projections.

Figure 8:
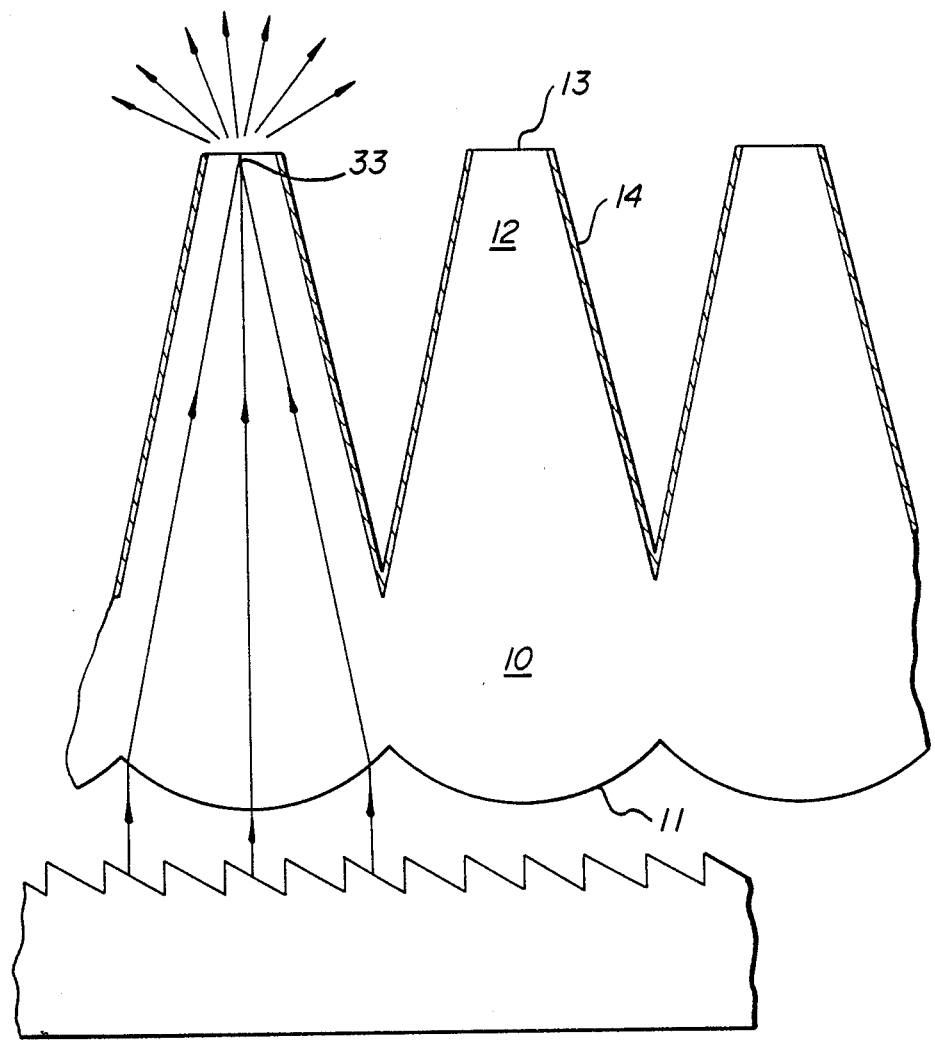
FIG. 8 shows a cut through the drawing shown on FIG. 2, according to the present invention, for illustration of the path of rays.

In FIG. 8 is shown part of the path of rays through the concerned screen. It is seen that a parallel pencil of rays strike lens 11. Then light beams are concentrated in lens 11's focal point 33, which is congruent at the projections tops 13 and which—after diffusion by means of refractive powder at or on the tops 13 of projections 12—are diffused to an observer.

It is not decisive for the invention whether the projection top 13 is plane or has convex or concave form, or whether the refractive medium is placed at the top or on the surface 13.

Figure 9:
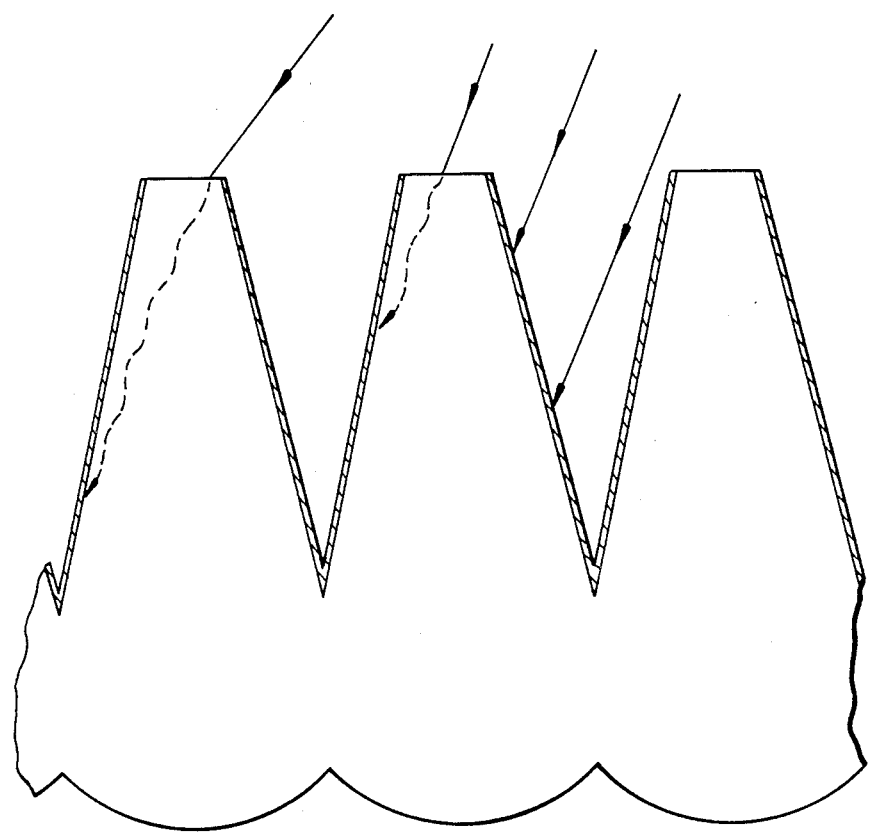
FIG. 9 is a diagram showing that daylight rays are absorbed in the front side of the screen, according to the present invention.

FIG. 9 shows a cut through the present invention for illustration of how light beams from the room are absorbed by the black colour.

EXAMPLE 1

Figure 10:
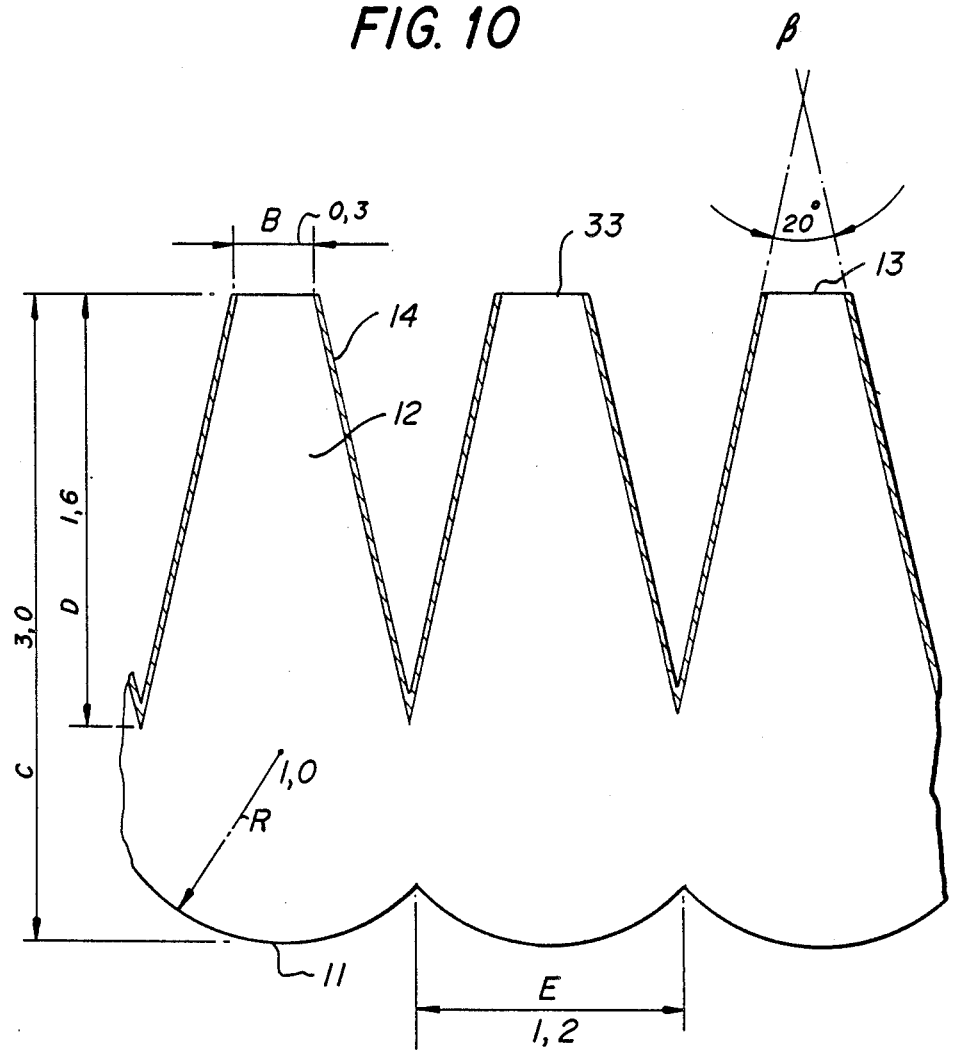

By means of a mould with a profile as illustrated in FIG. 10 was cast a 3 mm thick plate of PMMA with 120 g $SiO_2$ per $m^2$ and with a grain size of 15–40 u. The distance between lenses 11 was 1.2 mm. Radius of curvature for lens 11 was 1.0 mm, the angle $\beta=24°$. The depth of the grooves between the projections 12 was 1.65 mm. The width of the projection tops 13 was 0.3 mm.

After the casting mould had been filled it was placed horizontally, with the outwardly extending, elongated projections 12 turning downwards. Thereby the refractive powder sedimented so that it settled like a well defined layer at the surface of projection 13 and with a thickness less than 100 u. When the screen was taken out of the casting mould, the projection tops 13 were applied with Polyvinyl alcohol (PVA). Then black colour was applied on the sides of projections 12.

After an appropriate drying time the PVA film was removed from projection tops 13.

The screen then showed the following parameters:
Peak Gain: 3.5
½ Horizontal peak gain: 25°
½ Vertical peak gain: 25°.

Peak gain means the direct-transparent light measured as normal to the surface in comparison to a known reference.

Figure 3:
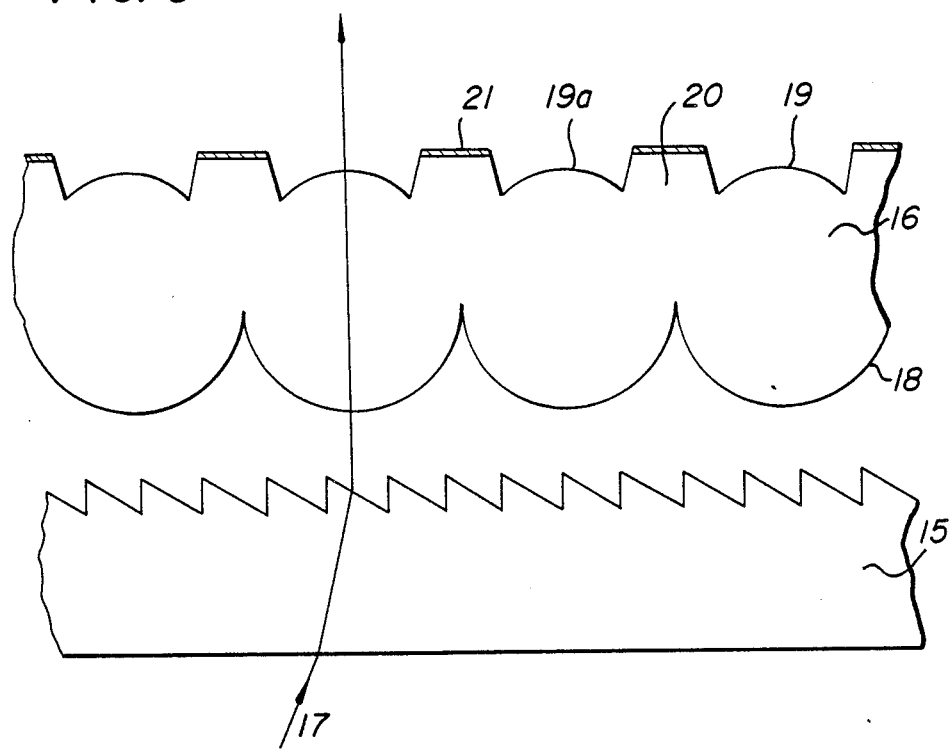
FIG. 3 shows a cross section of the known screen construction.
Figure 4:
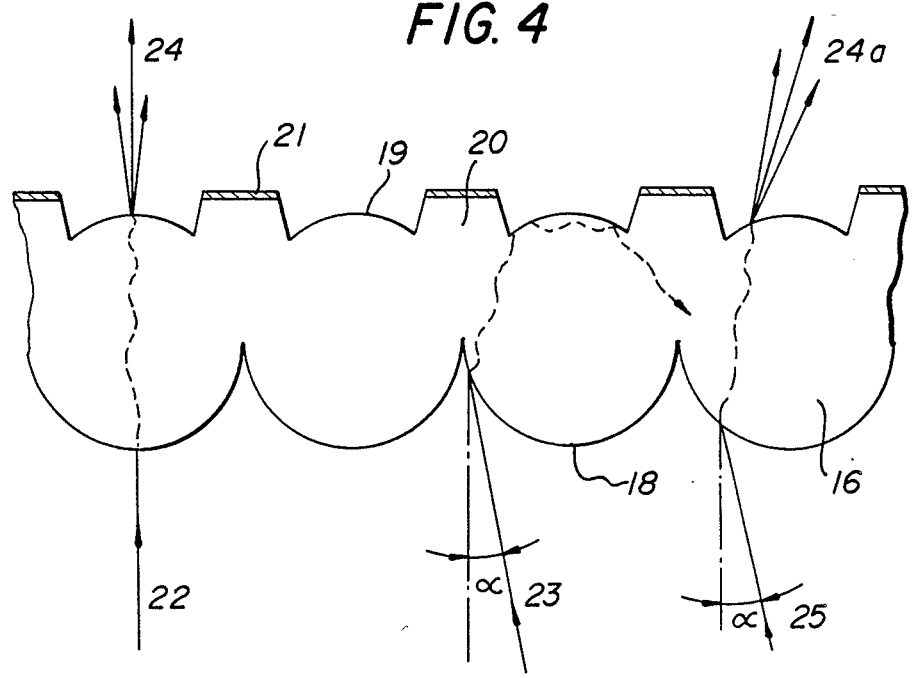
FIG. 4 shows inner reflections in screen element 16, shown in FIG. 3.
Figure 5:
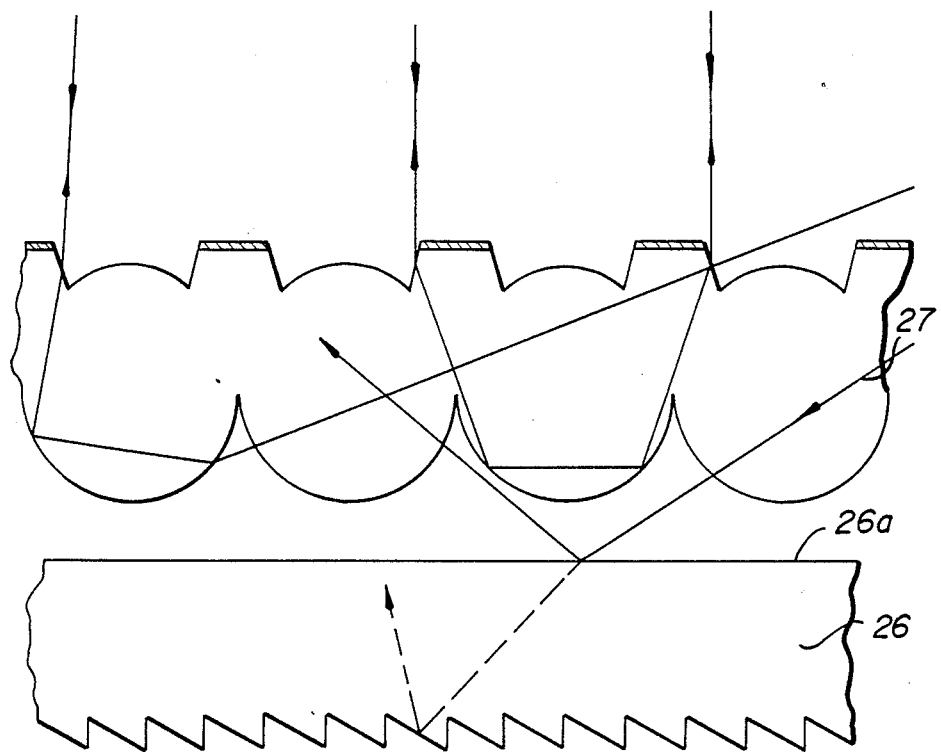
FIG. 5 shows reflections of room light in screen shown in FIG. 3.
Figure 6:
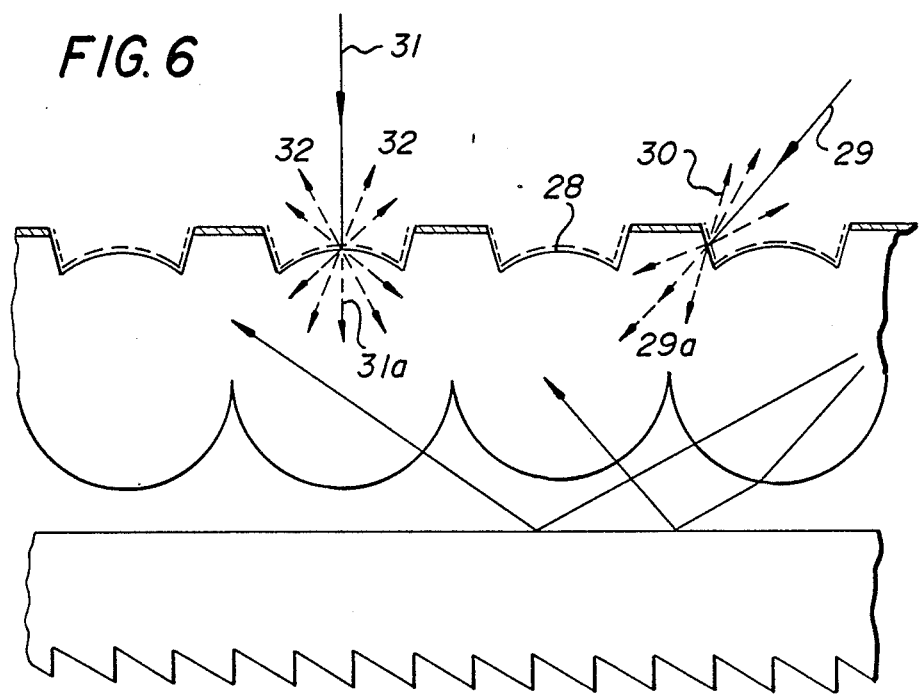
FIG. 6 shows reflections and spreading of the light in the mat surface of the front side of the screens of FIGS. 3–5.
Figure 7:
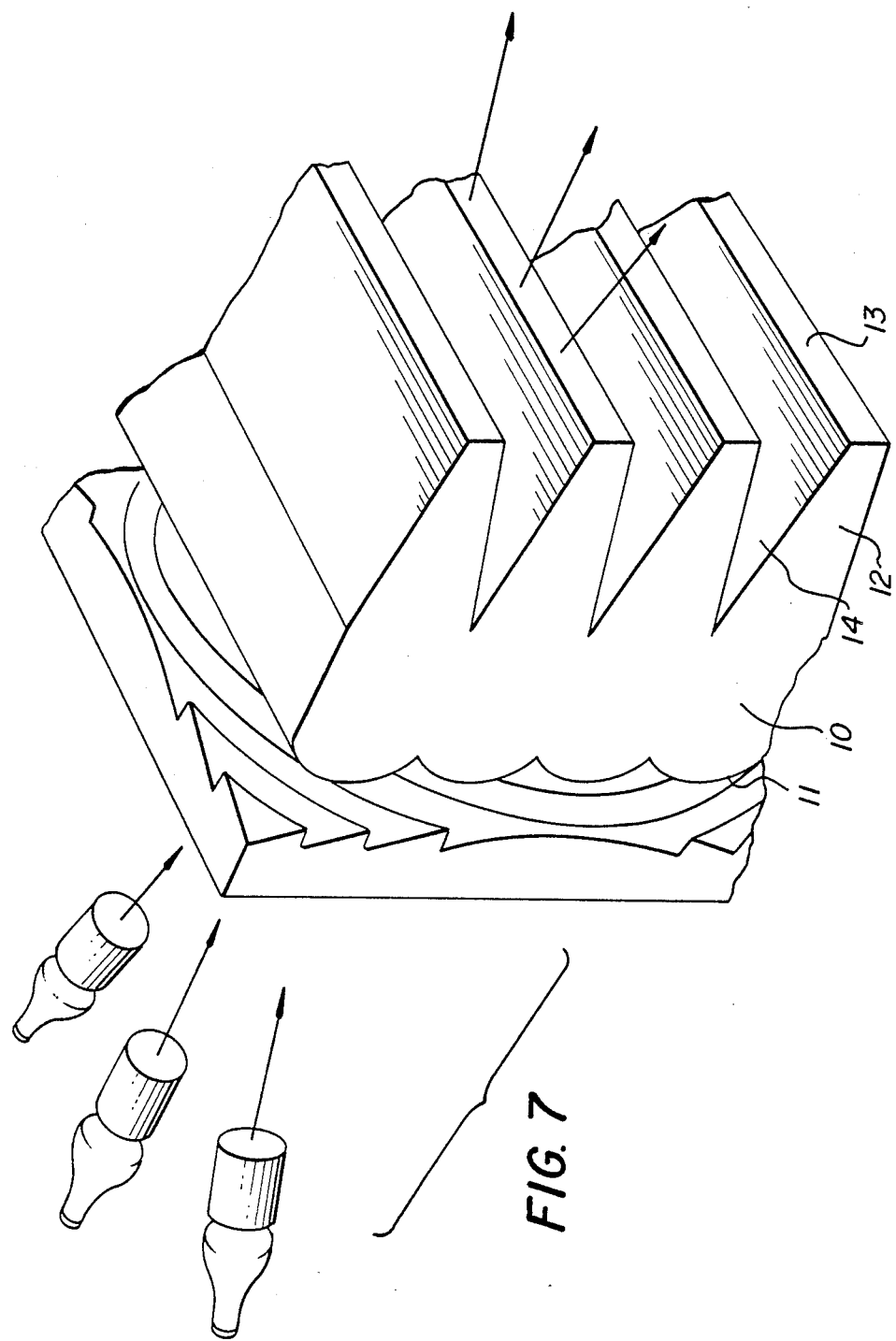
FIG. 7 shows a perspective cut of an embodiment for the screen, according to the invention.

Contrast conditions when the TV is switched off:

| Screen, as ex. 1 | | Known, black-striped screen, as FIG. 3 | |
|---|---|---|---|
| Screen | White ref. | Screen | White ref. |
| 1,4 | 58 | 9,4 | 60 |

The screen showed extreme high contrast and good efficiency so that the picture was made visible over a wide visual angle, horizontally as well as vertically at a visual field of $+-90°$.

EXAMPLE 2

In this example a PMMA plate was cast as described in ex. 1. The depth D of the grooves between the projections (or the height of the projections) 1.2 mm. Radius for lens 11, 1.0 mm. Lens 12 height $D=1.6$ mm. The angle $\beta=20°$. Width of projection 12's top 13 was 0.6 mm.

After casting a film of PVA was applied to top 13 of projections 12 the test proceeded as in example 1.

The screen showed the following parameters:
Peak Gain: 3.6
½ Horizontal peak gain: 24°
½ Vertical peak gain: 24°.

Contrast conditions when the TV is switched off:

| Screen, as ex. 2 | | Known, black-striped screen, as FIG. 3 | |
|---|---|---|---|
| Screen | White ref. | Screen | White ref. |
| 1,6 | 60 | 9,6 | 61 |

The screen showed extreme high contrast and good efficiency, so that the picture was made visible over a wide visual angle, horizontally as well as vertically, at a visual field of $+90°$.

CONCLUSION

It can be seen that there is only little difference between the two screens of the preceeding examples 1 and 2 as far as the contrast is concerned, despite the fact that the width B has double the width in ex. 2 as in ex. 1. The reason for this being that the depth D of the groove between the projections 12 is the same for both examples.

EXAMPLE 3

In this example was made a screen, wide design and measurements as shown in FIG. 10. The screen was extruded by clear PMMA without diffusing powder. Then the projection tops 13 were applied with a film of PVA. The sides of lens 12 were sprayed with black colour. Then the PVA film on projections caps B of projection 12 was removed. A mixture of lacquer with a diffusing medium was coated on the entire surface.

The screen showed the same parameters as ex. 1.

We claim:

1. A transparent rear light projection screen comprising a picture forming element having on its rear side outwardly extending, parallel elongate convex lenses the focal length of each of which is equal to the thickness of the screen element and which lenses transmit light coming from behind to the front of the screen, which light is only deflected at the convex lenses, and having on its front side outwardly extending elongate projections parallel to said convex lenses, said projections having tops from which the light transmitted from said convex lenses can emit, said front side having V-shaped grooves between the tops of said projections, said grooves being covered or filled up with material impenetrable to light to increase contrast, and having a depth which is at least twice the width of the width of said tops of said projections, and which is greater than one fourth the thickness of the picture forming element.

2. The screen of claim 1, wherein a picture forming refractive powder is placed under said tops of said projections.

3. The screen of claim 1, wherein a light diffusing picture forming medium is coated on said tops of said projections.

4. The screen of claim 1, wherein the grooves are filled up with said material impenetrable to light.

5. The screen of claim 1 wherein the sides of the projections are covered with said material impenetrable to light.

6. The screen of claim 1 wherein the sides of the projections are not even.

7. The screen of claim 1, wherein the tops of said projections are glossy, mat or half-mat.

8. The screen of claim 1, wherein the top of each projection is lens-shaped.

9. The screen of claim 1, wherein the screen comprises the following measurements: projection top width=0.3 mm, groove depth=1.6 mm, thickness of the picture forming element=3.4 mm, convex lens radius=1.2 mm, distance between convex lenses=1.2 mm, angle formed by the sides of the projections=24°.

* * * * *